United States Patent [19]

Pharmakidis

[11] 4,286,420
[45] Sep. 1, 1981

[54] HEAT RETENTION WALL SYSTEM

[76] Inventor: Panayiotis D. Pharmakidis, 7623 Bonniebrook, Sylvania, Ohio 43560

[21] Appl. No.: 31,074

[22] Filed: Apr. 18, 1979

[51] Int. Cl.³ .............................................. E04B 1/74
[52] U.S. Cl. ........................................ 52/404; 52/1; 52/303; 52/410; 126/430
[58] Field of Search ..................... 52/1, 171, 404, 408, 52/410, 220, 303, 407; 98/31; 126/430

[56] References Cited

U.S. PATENT DOCUMENTS

| | | | |
|---|---|---|---|
| 2,645,824 | 7/1953 | Titsworth | 52/407 X |
| 3,313,072 | 4/1967 | Cue | 52/303 |
| 3,318,056 | 5/1967 | Thompson | 52/303 X |
| 3,368,473 | 2/1968 | Sohda et al. | 98/31 |
| 3,455,076 | 7/1969 | Clarvoe | 52/302 |
| 3,466,222 | 9/1969 | Curtis | 161/160 |
| 3,474,583 | 10/1969 | Manias | 52/302 |
| 3,525,189 | 8/1970 | Nelsson | 52/410 X |
| 3,616,139 | 10/1971 | Jones | 52/408 X |
| 3,783,569 | 1/1974 | Roussin | 52/480 |
| 4,054,246 | 10/1977 | Johnson | 126/430 X |
| 4,062,347 | 12/1977 | Jensen | 126/430 |
| 4,072,141 | 2/1978 | Fillias et al. | 98/31 X |
| 4,075,806 | 2/1978 | Alderman | 52/407 X |
| 4,114,334 | 9/1978 | Thoren | 52/303 |

OTHER PUBLICATIONS

"Walls to Save Energy" Published by the Brick Institute of America.
Dryvit "Exterior Wall Insulation and Finish System".

Primary Examiner—Carl D. Friedman

[57] ABSTRACT

A wall system having an internal mass for inwardly radiating retained heat, an insulation layer and an external heat-conductive skin spaced apart from the insulation layer for permitting the external environment to influence the air space conditions. The air space becomes the external environment to the insulation layer, rather than an exterior mass as with conventional wall systems, thereby reducing the load for the internally operating air conditioning and heating system. The air space is vented top and bottom so as to allow convection currents of accumulated hot air in the space to be created, thereby not only isolating the external environment from the air space but minimizing extremely hot air accumulation of air and when desired increasing the temperature in the air space above environmental conditions for enhancing the efficiency of the internally operating air conditioning and heating systems.

35 Claims, 6 Drawing Figures

HEAT RETENTION WALL SYSTEM

BACKGROUND OF THE INVENTION

1. Field of the Invention

This invention pertains to wall construction and more particularly to wall construction that provides heat retention for interior purposes while accommodating to the exterior environment in an energy-saving manner.

2. Description of the Prior Art

Wall construction for residential and commercial buildings is varied and usually comprise a plurality of layers of load or non-load supporting materials, heat insulation, and moisture proofing materials. Actual heat flow through a wall section, under real conditions, involves many variables, but the primary factor used for steady-state calculations is the calculated thermal conductance, or U value, for the wall. In effect, the U value is a measure of heat loss, usually expressed in terms of BTU per hour per square foot of surface. The reciprocal of thermal conductance is thermal resistance, its units being typically Fahrenheit degrees per BTU per hour per square foot. Thus, a wall with a U value of 0.25 would have a resistance value of $1/U = 1/0.25 = 4$.

But the U value or thermal resistance value does not tell the whole story concerning heat loss. The factor of time lag is an important ingredient since it is a measure of the thermal inertia of the wall system. Time lag is the delay caused by heat storage and its subsequent release (usually by radiation) by the structure. In many respects, and building types, the time lag factor is the more important of the two factors since it is a measure of how quickly the interior face or surface of a wall at a steady-state temperature changes when the exterior surface or face is exposed to a different temperature. Therefore, the combined factors of U value and time lag are important in determining the heat retention efficiency of a wall structure. Heat retention is directly dependent on the non-insulated mass of the system. The greater the mass, the greater the heat retention.

It is possible using conventional construction techniques to increase the heat retention value of a wall, but to do so usually requires increasing the mass of the wall. To increase the mass generally means to increase the cost of construction. Furthermore, increasing the heat retention value of a wall is not totally beneficial to energy conservation, since a heat retaining structure has thermal inertia requiring, for instance, internally air conditioning a room after dark in the summer time when the sun has gone down and the environmental outside temperature has cooled down considerably.

Many wall systems comprise three basic elements: the interior mass, the core insulation, and the exterior mass. Assuming that the interior mass is at a steady-state condition of 70° F. and the exterior mass is at a steady-state condition of 100° F., as exposed to the environment of a hot summer day. When the sun goes down and the environment reduces to 80° F., the interior mass is still exposed to the much higher temperature of the retained heat being radiated from the exterior mass. Hence, the air conditioning system cooling the interior area next to the interior mass continues to run at a cooling level not indicative of the outside environment. The reverse occurs in cold climates where the mass retains the exterior cold temperature.

In addition to the absolute temperature value of a room, comfort of an individual within the room is dependent on another phenomenon. If the nearby wall where the individual is positioned is much colder or warmer than the environment within the room, the individual will be uncomfortable because of the phenomenon of relative radiation. That is, if the wall is at a high temperature, the wall will be as a heat radiator and will not be comfortable to stand before, whereas if the wall is cold, it will act as a temperature absorber, drawing heat away from the body of the individual, even giving the sensation of a draft.

Therefore, it is a feature of the present invention to provide an improved wall system so that the environment within the interior area adjacent the wall system is retained for a much longer period of time when compared with the period of time for an equally insulated wall system of conventional construction having the same U value by increasing the time lag thereof, thereby increasing the efficiency of the air conditioning and heating systems for the interior area.

It is another feature of the present invention to provide an improved wall system for minimizing wide temperature variations to which the interior face of the system is subjected, thereby greatly increasing the comfort of individuals within the room bounded by the wall by stabilizing the wall-radiation conditions, while also minimizing extreme temperature exposures of the wall mass, thereby achieving substantially constant maintenance effort and cost by reducing thermal expansion and contraction.

SUMMARY OF THE INVENTION

The invention embodiments disclosed herein include a wall system having a vertical interior mass, an insulation layer external to the interior mass and a conductive exterior or skin affixed to the system so that there is an air space between the exterior and the insulation layer. The air space is vented at the top and bottom so that, as the air in the space is heated by solar energy above the temperature of the external environment, air currents rise in the air space. Such a structure effectively eliminates the adverse time lag effects of an exterior mass used in conventional wall structures and actually changes the environment next to the insulation layer to be closer to the interior environment than the actual external environment. That is, the air space is cooler on hot days than the external ambient conditions and warmer on cold days than ambient. A reflective paint or other treatment of the exterior skin delays the heating effect of the conductive exterior, further reducing the air conditioning load.

A waterproofing membrane covering the insulation ensures the integrity, and hence efficiency, of the interstices of the insulation layer by preventing moisture penetration and allowing the use of most types of insulation, even those adversely affected by water. It also allows the exterior skin material to have joints which are not waterproofed, thus allowing construction at lower cost and with easier to maintain construction of wall joints than would otherwise be required. Any rainwater penetrating the exterior skin is disposed of at the bottom of the wall panels, sections, or as otherwise specifically provided.

A thermal break in the installation furring members or mounting edges of the panels comprising the exterior or skin prevents loss of heat from the interior mass to the outside by heat conduction.

One preferred embodiment includes a vapor barrier on the inside surface of the insulation so that condensation of the vapor sometimes created when the dew point is within the insulation is avoided.

One structure of the invention includes temperature sensing means in the interior mass and externally for controlling motorized dampers operating in top and bottom vents between the air space and the external environment. These dampers help adjust the air flow in the space. Alternatively, an externally mounted photocell can be used as the control means for adjusting the dampers. Also, warmer-than-external-environmental air in the air space can be channeled for purposes of increasing the efficiency of a heat pump or other internally operating heating and air conditioning system.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiments thereof which are illustrated in the appended drawings, which drawings form a part of this specification. It is to be noted, however, that the appended drawings illustrate only typical embodiments of the invention and are therefore not to be considered limiting of its scope, for the invention may admit to other equally effective embodiments.

IN THE DRAWINGS

Figure 1:
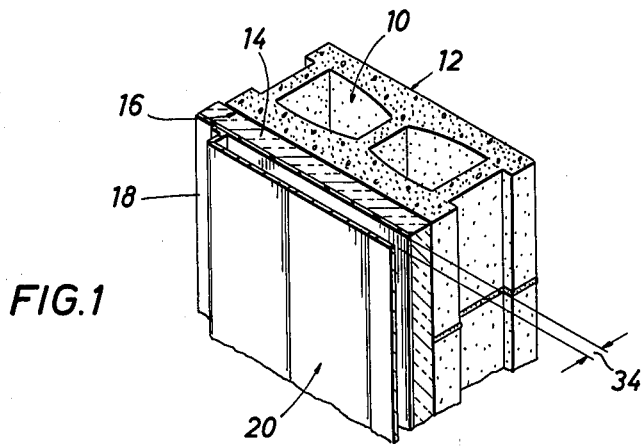

FIG. 1 is an oblique view of a fragment of a wall structure in accordance with a preferred embodiment of the present invention.

Figure 2:
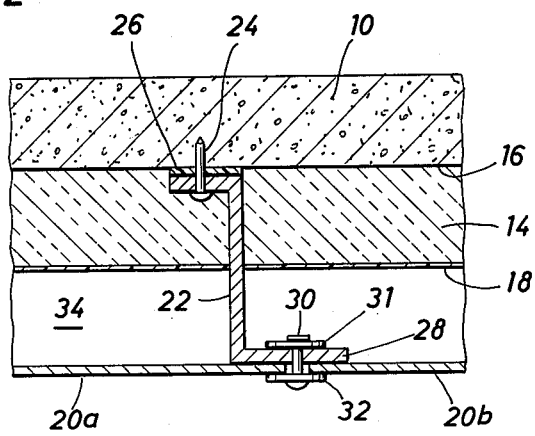

FIG. 2 is a partial cross-section of a way of connecting some of the elements comprising the wall structure shown in FIG. 1.

Figure 3:
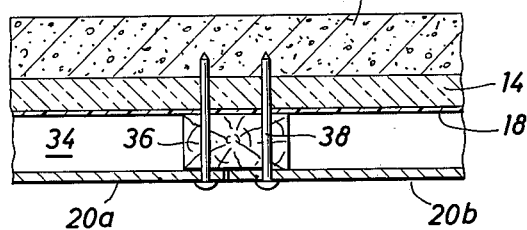

FIG. 3 is a partial cross-section of another way of connecting some of the elements comprising the wall structure shown in FIG. 1.

Figure 4:
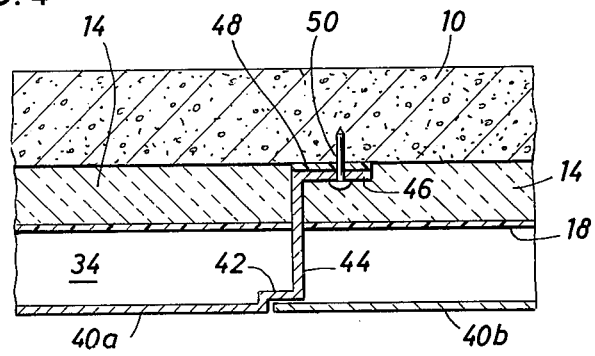

FIG. 4 is a partial cross-section of yet another way of connecting some of the elements comprising the wall structure shown in FIG. 1.

Figure 5:
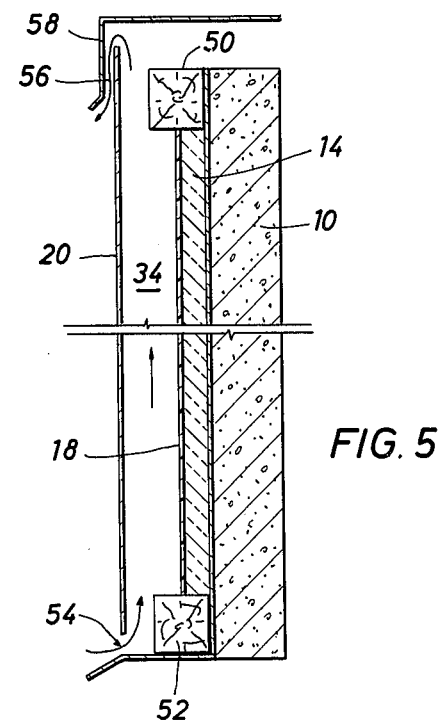

FIG. 5 is a vertical cross-section of a fragment of a preferred embodiment of the present invention.

Figure 6:
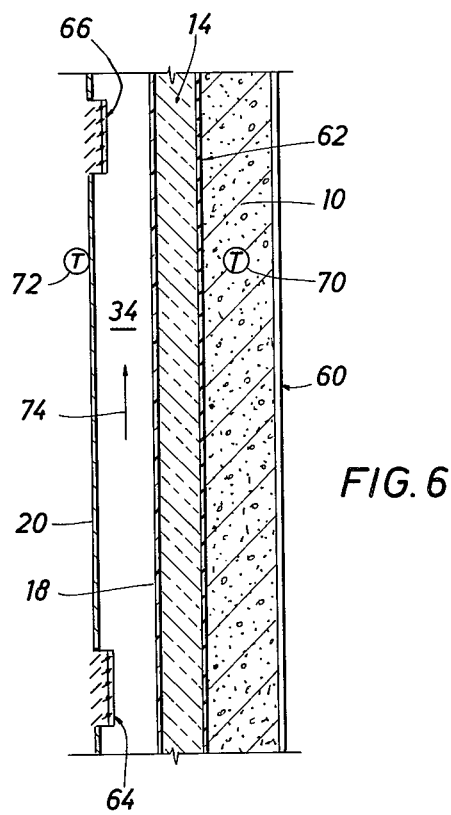

FIG. 6 is a vertical cross-section of a fragment of another preferred embodiment of the present invention.

DESCRIPTION OF THE PREFERRED EMBODIMENTS

Now referring to the drawings and first to FIG. 1, an oblique, isometric view of a preferred embodiment of the invention is shown in cross-section. The illustrated vertical wall includes an interior mass, which is illustrated as a concrete block wall 10. This portion of the overall wall structure may act as the loadbearing portion or nonloadbearing wall. For interior aesthetics, the interior face 12 of wall 10 may be finished by plaster or other suitable covering, although in many installations the mass is left untreated.

Insulation layer 14 is positioned opposing exterior face 16 of block wall 10. The insulation layer may be of any suitable material such as rock wool, Fiberglass, Styrofoam or the like. A typical installation uses a 1½ inch thickness of Styrofoam for this purpose. Preferably the resistance value R of the insulation should be between 1 and 80. The insulation layer is then covered by a waterproofing membrane 18. This membrane is typically a rubberized or plastic sheet or coating to protect the insulation from water or moisture penetration. Its attachment to the insulation can be made by any convenient means such as by gluing, stapling or the like, or it can be supported in place by the furring strips or other building structures to be hereafter attached to the exterior of the wall, as hereinafter described. In the event the membrane is penetrated by staples, screws, nails or the like, in order to achieve its attachment, the membrane should be sealed at such points of attachment to prevent water penetration into the insulation. It is well known that moisture in the form of condensation, dew or otherwise tends to fill up the interstices of insulation material and thereby decrease the temperature efficiency of the insulation for some types of insulations, such as Fiberglass.

In a typical installation, furring strips are connected to the exterior surface of the concrete wall by use of concrete nails or the like, the strips projecting outwardly through the insulation layer and membrane to provide means for securing the conductive exterior 20 to the overall wall structure. This conductive exterior, also referred to as the "skin", can conveniently be prefabricated in the form of panels, and in alternate structures more fully explained hereinafter, can be directly attached to the exterior face of the interior wall mass.

Now referring to FIGS. 2-4, alternate methods of attaching a "skin" to the interior wall mass are illustrated. FIG. 2 shows a structure in which a Z-shaped metallic furring member 22, typically aluminum, is attached via concrete nail 24 piercing one foot of the furring member and exterior face 16 of wall mass 10. Thermal break means, such as a vinyl or neoprene layer 26, isolates furring member 22 from conductive contact with wall 10.

The other foot 28 provides openings for attaching exterior panel sections 20a and 20b to the structure via bolts 30 and plates 31 and 32. Alternate interlocking or other type of joints, rather than "screwed" type joints, may be used as well as any other means of securing attachment. Importantly, an air space 34 is left between the inside of skin 20a, 20b and membrane 18. To be effective for its intended purpose, more fully set forth below, the depth dimension of the air space is typically on the order of ½ inch to 12 inches. Although the primary direction of travel of the air within the air space is vertically upward, furring member 22 may have convenient side openings to permit at least some horizontal circulation of air in the air spaces, where more than vertical gravity air circulation is desired.

FIG. 3 illustrates another suitable furring member 36, which in this case is merely a wooden support. Since wood is a poor conductor of heat it forms its own thermal break between the skin and the interior mass. Nails or screws 38 can be used for attaching the skin to interior mass. The furring member can either be located in the position shown when the insulation need is structurally somewhat firm, such as in the case of insulation bats, or may be placed adjacent the interior mass, as in the FIG. 2 structure. In either event, it is important to have air space 34 within the wall structure, as above described.

FIG. 4 illustrates yet another way of attaching the conductive exterior members to the interior mass part of the wall. The edges of exterior 40a are formed, such as in an extrusion or stamping process, to form a lip 42 and then a side wall 44, ending in a foot 46. It may be evident that the shape of the edge is similar to the furring member shown in FIG. 2. Thermal break member 48 is secured between foot 46 and interior mass 10 as an interruption of the heat that would otherwise be conducted from skin 40a, 40b to mass 10. Appropriate nails or screws or bolts 50 are used to secure foot 46 to mass 10. Lip 42 provides support for the straight edge of adjacent exterior skin panel 40b. In the same manner as described above, air space 34 is created between the skin and the membrane.

Now referring to FIG. 5, a simplified cross-section of the wall is shown in vertical section. Cross support members 50 and 52 are secured top and bottom and/or in between, spaced properly with respect wall mass 10. An opening 54 is provided around, or alternately through, wall 20 at the bottom and an opening 56 is provided around, or alternately through, wall 20 at the top. These openings permit air circulation through air space 34 from bottom to top, as shown by the arrows in the drawing. It is convenient to have a flashing overhang 58 to ensure that space 34 is not directly open to the elements and filled with leaves or does not receive excessive dust or blowing sand.

The skin can be conveniently made of any of the variously available conductive materials used for exterior in the marketplace. These include aluminum panels (from 1/64 inch to 1 inch thickness); laminated, tempered or otherwise strengthened glass (from ⅛ inch to 1½ inches thickness); steel or other metals (from 26 gauge to 1 inch thickness); plaster, cement board or plastic sandwich panels or other similar coverings (from 1/16 inch to 20 inches thickness); and Fiberglass (from 1/16 inch to ¾ inch thickness). Any conductive material or structure suitable for operating in the desired conductive manner can be used.

In operation, the interior wall mass retains heat dependent on a combination of factors, but primarily dependent on its material (s) and its installation. The wall mass in accordance with this invention is built of any masonry or any other material so as to achieve at least a structure which is 20 pounds per square foot and not over 500 pounds per square foot of wall surface. Such a wall mass acts as a heat "radiator" for maintaining the temperature of the room while being isolated by the insulation from the exterior environment. The greater the mass the more effective the radiator effect becomes.

Operation of the system can best be understood by examples. Assume that the outside environment is 100° F. and the interior temperature is set at 70° F. The conductive materials of the skin allows the air in the air space to heat up and to become warmer than the outside air temperature. When this occurs hot air in the air space tends to rise and because of the ventilation provided through the openings, air circulates from bottom to top, tending to circulate fresh air past the insulation. The air does not become entrapped so as to be warmer than the outside environment. As the sun goes down, the air in the space quickly stabilizes to the environment, thereby minimizing the air conditioning load for cooling the interior at night or even the next morning in hot summer days. That is, there is almost no mass outside of the interior mass. Since there is air circulation through the air space, there is virtually no heat retention exterior to the interior wall mass. This phenomenon is achieved by "gravity ventilation".

Assume that the temperature outside is 0° F. and again the internal building temperature is set at 70° F. The temperature in the air space is isolated from the wind and other chilling factors except the factor of the cold air. Because of the conductivity of the skin, however, when there is direct sunlight on the skin, the temperature in the air space actually rises above the ambient or environmental level. This has the effect again of reducing the load on the internal energy system that maintains the temperature at the 70° F. level, providing considerable heating fuel savings in the colder climates.

Now referring to FIG. 6, an improved system of controlling the air flow to the entirely passive system just described is shown. The wall system includes wall mass 10, which may be interiorly surfaced by finish 60 by any convenient method. The exterior face of wall mass 10 is treated with a vapor barrier 62. Any suitable material such as stripped polyethylene film, 6–8 mil thick, can be used for this purpose. Insulation layer 14 is positioned adjacent the vapor barrier and waterproofing membrane 18 is placed to seal and cover the insulation, all as discussed in conjunction with the description of the previous embodiments.

The skin 20 is connected to the overall wall structure in any of the manners previously discussed so as to provide an air space 34 between the skin and the membrane. However, in this embodiment, motorized dampers 64 (at the bottom) and 66 (at the top) are provided to permit the circulation of air by "gravity ventilation", which phenomenon has been previously discussed. Hence, dampers 64 cover the air intake opening and dampers 66 cover the air discharge opening.

The following example of operation assumes summertime conditions.

A temperature sensing device 70, such as a thermostat, is embedded in wall mass 10 and another similar temperature sensing device 72 is mounted externally to skin 20. When the temperature sensed by device 72 is much greater than that sensed by device 70, it is desirable to have as much air circulation 74 through air space 34 as possible and, therefore, the controls operate in conventional fashion to completely open dampers 64 and 66. Typically, these dampers are comprised of louvers or slots covered with bird screen.

When the temperatures sensed by devices 70 and 72 are about equal, the dampers are still slightly opened to permit the circulation of air; however, they are not wide open.

When the temperature sensed by device 72 is much less than the temperature sensed by device 70, it is desirable to keep the air space closed off so as to permit the air space temperature to rise as much as possible through heat conductivity through the conductive skin, as well as any heat that might find its way back through the insulation from the wall mass. In such event, the dampers are motorized shut.

The exterior thermostat resets the control thermostat located inside the wall mass, which provides control of the motorized dampers for appropriate ventilation of the air space.

Alternatively, device 72 can be a photocell device for measuring the intensity of the sunlight, rather than the environmental temperature. In this event, when the measure is great and the temperature sensed by device 70 is at an acceptable predetermined level, then the dampers are motorized open. Otherwise, they are motorized toward shut. Optional controls can be provided to the dampers by having both an external temperature sensing device as well as a photocell.

For wintertime operations, the thermostats may be used to retain warm air in the air space even though the temperature differential may exceed the limits that would produce open vents under summertime operating conditions.

It should be recognized that the temperature sensing device embedded in the wall mass is not the thermostat inside the room used for controlling the air conditioning and heating system for the room. It is part of the "reset" mechanism for winter and/or summer and/or any other desirable settings per building owner's request.

It may be further observed that venting may be used for channeling some of the solar heated air inside the building for heating purposes. That is, since the space temperature is warmer than the external environment, the temperature sink for a heat pump can be placed in communication with this space, rather than out of doors, for increased efficiency. In some cases, just the heat generated by the sun and trapped air will be sufficient to heat the internal area of the building without any heat generated by the conventional heating system.

The advantage of placing the vapor barrier between the insulation and the exterior face of the wall mass is that it this permits the dew point to be inside the insulation and, therefore, further provides conditions which would allow use of virtually any kind of insulation to be used for insulation layer 14.

It is also true that for all of the embodiments discussed above, the reflective quality of the surface of the exterior or skin has an effect on the temperature of the air in the space. This is a different quality than the conductive quality of the surface. A highly reflective surface will reduce the acceleration rate of heating the air in the air space. This permits there to be ample time for the convection currents of the gravity ventilation phenomenon to carry the very hot air from the space, a more important factor for hot external environmental conditions than for cold.

While particular embodiments of the invention have been shown and described, it will be understood that the invention is not limited thereto, since modifications may be made and will become apparent to those skilled in the art. For example, the essentially passive air movement system described above can be combined with an active air flow system in the form of blowers or the like, if desired.

What is claimed is:

1. A wall, comprising
   a vertical interior mass in the range between 20 pounds per square foot and 500 pounds per square foot of wall surface,
   an insulation layer positioned opposing the external surface of said interior mass, and
   a conductive exterior affixed with respect to said insulation layer so as to have space for air circulation between said conductive exterior and said insulation layer.
2. A wall in accordance with claim 1, and including a waterproofing membrane covering said insulation layer.
3. A wall in accordance with claim 2 and including
   a waterproofing membrane covering said insulation layer, and
   furring strips connected to said interior mass through said membrane and said insulation layer,
   said conductive exterior being affixed to said furring strips,
   said attaching points through said membrane being sealed from water penetration.
4. A wall in accordance with claim 1, and including furring strips connected to said interior mass through said insulation layer, said conductive exterior being affixed to said furring strips.
5. A wall in accordance with claim 3, wherein said furring strips include openings therethrough to permit air passage.
6. A wall in accordance with claim 4, and including a thermal breaker connected to said furring strips for isolating the air space external to the insulation layer from said interior mass.
7. A wall in accordance with claim 4, wherein said furring strips are wood.
8. A wall in accordance with claim 4, wherein said furring strips are metal.
9. A wall in accordance with claim 8, wherein said metal is aluminum.
10. A wall in accordance with claim 1, wherein said interior mass includes concrete.
11. A wall in accordance with claim 10, wherein said interior mass includes materials of not less than 20 pounds per square foot of surface.
12. A wall in accordance with claim 1, wherein said insulation layer includes a resistance value of less than 80.
13. A wall in accordance with claim 1, wherein said conductive exterior is highly reflective.
14. A wall in accordance with claim 1, there being vertically spaced apart vents to the space for air between said conductive exterior and said insulation layer to achieve gravity ventilation around said conductive exterior.
15. A wall in accordance with claim 1, wherein said conductive exterior is aluminum.
16. A wall in accordance with claim 15, wherein said aluminum is not in excess of 1 inch.
17. A wall in accordance with claim 1, wherein said conductive exterior is glass.
18. A wall in accordance with claim 17, wherein said glass is not in excess of 1½ inches.
19. A wall in accordance with claim 17, wherein said glass is laminated.
20. A wall in accordance with claim 17, wherein said glass is tempered.
21. A wall in accordance with claim 1, wherein said conductive exterior is steel.
22. A wall in accordance with claim 1, wherein said conductive exterior includes plaster.
23. A wall in accordance with claim 1, wherein said conductive exterior includes cement board.
24. A wall in accordance with claim 1, wherein said conductive exterior includes Fiberglass.
25. A wall in accordance with claim 24, wherein said Fiberglass is not in excess of ¾ inch.
26. A wall in accordance with claim 1, wherein said conductive exterior includes sandwich panels.
27. A wall in accordance with claim 26, wherein said panels are not in excess of 2 inches thick.
28. A wall in accordance with claim 1, and including an insulation barrier between said mass and said insulation layer.
29. A wall in accordance with claim 1, wherein said conductive exterior includes an upper vent and a lower vent to the space for air between said conductive exterior and said insulation layer to achieve gravity ventilation.
30. A wall in accordance with claim 30, and including
    first temperature sensing means embedded in said interior mass,
    second temperature sensing means positioned exterior to said conductive exterior, motorized damper means located in at least one of said upper and lower vents for opening and closing thereof in response to the temperature difference sensed by said first and second temperature sensing means.

31. A wall in accordance with claim 30, wherein said second temperature sensing means provides for resetting the control of said motorized damper means.

32. A wall in accordance with claim 31, wherein said damper means operates so as to be open widest when the temperature sensed by said second sensing means is higher than the temperature sensed by said first sensing means, operates so as to be partially open when the temperature sensed by said first sensing means equals the temperature sensed by said second sensing means, and operates so as to be open the least when the temperature sensed by said first sensing means is higher than the temperature sensed by said second sensing means.

33. A wall in accordance with claim 31, wherein said first and second temperature sensing means operate to open said dampers in the presence of high temperatures and to close said damper in the presence of low temperatures.

34. A wall in accordance with claim 29, and including
photocell means positioned exterior to said conductive exterior, and
motorized damper means located in at least one of said upper and lower vents for opening and closing thereof in response to the brightness of the sunlight sensed by said photocell means.

35. A wall in accordance with claim 1, wherein said interior mass is in the range between approximately 20 pounds per square foot and 80 pounds per square foot of wall surface.

* * * * *